United States Patent
Zhang (10) Patent No.: US 11,068,551 B2
(45) Date of Patent: Jul. 20, 2021

(54) METHOD AND APPARATUS FOR DISPLAYING CONTENTS OF GROUP CHAT

(71) Applicant: TENCENT TECHNOLOGY (SHENZHEN) COMPANY LIMITED, Shenzhen (CN)

(72) Inventor: Lei Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 668 days.

(21) Appl. No.: 15/793,341

(22) Filed: Oct. 25, 2017

(65) Prior Publication Data

US 2018/0046726 A1  Feb. 15, 2018

Related U.S. Application Data

(63) Continuation of application No. PCT/CN2016/082744, filed on May 20, 2016.

(30) Foreign Application Priority Data

Aug. 19, 2015 (CN) .......................... 201510511122.1

(51) Int. Cl.
*G06F 16/9535* (2019.01)
*G06F 16/957* (2019.01)
(Continued)

(52) U.S. Cl.
CPC ...... *G06F 16/9535* (2019.01); *G06F 16/9577* (2019.01); *H04L 51/04* (2013.01); *H04L 51/16* (2013.01); *H04L 65/403* (2013.01)

(58) Field of Classification Search
None
See application file for complete search history.

(56) References Cited

U.S. PATENT DOCUMENTS

2014/0040784 A1* 2/2014 Behforooz .......... H04L 65/1093
    715/758
2014/0074951 A1* 3/2014 Misir .................. H04L 12/1827
    709/206

(Continued)

FOREIGN PATENT DOCUMENTS

CN  101056188 A  10/2007
CN  101304454 A  11/2008
(Continued)

OTHER PUBLICATIONS

The World Intellectual Property Organization (WIPO) International Search Report for PCT/CN2016/082744 dated Sep. 1, 2016 6 Pages (including translation).

*Primary Examiner* — Tony Mahmoudi
*Assistant Examiner* — Umar Mian
(74) *Attorney, Agent, or Firm* — Anova Law Group, PLLC (57) ABSTRACT

Embodiments of the present invention provide a method for displaying contents of a group chat. The method includes: receiving a query message entered by a user and carrying a specified user name; sending the query message to a server to request a list of historical chat records corresponding to the specified user name, wherein the list of historical chat records are interrupted by a plurality of current chat records in the group chat; receiving the list of historical chat records that is sent by the server and pulled according to the specified user name; and displaying the list of historical chat records sent by the server following the plurality of current chat records to continue a topic carried by the list of historical chat records and interrupted by the plurality of current chat records.

20 Claims, 10 Drawing Sheets

(51) Int. Cl.
*H04L 12/58* (2006.01)
*H04L 29/06* (2006.01)

(56) References Cited

U.S. PATENT DOCUMENTS

| | | | | |
|---|---|---|---|---|
| 2015/0169208 A1* | 6/2015 | Cho | .................... | H04L 12/1827 |
| | | | | 715/752 |
| 2016/0277335 A1* | 9/2016 | Cheung | ............... | H04L 12/1822 |
| 2016/0330150 A1* | 11/2016 | Joe | ........................ | G06F 16/951 |

FOREIGN PATENT DOCUMENTS

| CN | 103279465 A | 9/2013 |
|---|---|---|
| CN | 104699378 A | 6/2015 |

\* cited by examiner

| Group | |
|---|---|
| Chat | Group notifications |
| Yutian(456892222) 2015/4/8 6:05:36<br>Who has a pet dog at home? What do you do when nobody is at home because of work?<br>Lan(45612224522) 2015/4/8 6:05:36<br>I have one, get a dog cage.<br>Yutian(456892222) 2015/4/8 6:07:36<br>Good idea, what to feed?<br>Rex(564556666) 2015/4/8 6:07:47<br>Who has a second-hand iPhone 6 to sell? High price for that.<br>Jimmy(859754452) 2015/4/8 6:08:47<br>I have, how much?<br>Lan(45612224522) 2015/4/8 6:10:36<br>Reply to yutian: Good idea, what to feed?<br>One bowl of rice is enough. | |
| | Group members |
| A ◯ | Yutian<br>Jimmy<br>Lan<br>Rex<br>... |

11 — (points to chat area)
12 — (points to input area)

METHOD AND APPARATUS FOR DISPLAYING CONTENTS OF GROUP CHAT

RELATED APPLICATION

This application is a continuation application of PCT Patent Application No. PCT/CN2016/082744, filed on May 20, 2016, which claims priority to Chinese Patent Application No. 201510511122.1, entitled "METHOD AND APPARATUS FOR DISPLAYING CONTENTS OF GROUP CHAT" filed with the Chinese Patent Office on Aug. 19, 2015, which is incorporated by reference in its entirety.

FIELD OF THE TECHNOLOGY

The present disclosure relates to the field of Internet communication technologies and, in particular, to a method and an apparatus for displaying contents of a group chat.

BACKGROUND OF THE DISCLOSURE

With the popularity of the Internet, instant messaging software becomes an important tool for more and more people to socialize. When users are chatting in a group, because new messages are updated relatively frequently, the users may miss messages previously sent by group members. In the existing technology, when a user needs to view previous messages, the user can only return to chat records and view messages one by one. However, for a relatively big group, this method cannot be used to quickly view the missing messages, significantly lowering the efficiency.

SUMMARY

Embodiments of the present invention provide a method and an apparatus for displaying contents of a group chat, to resolve a problem that in the existing technology missing messages cannot be viewed quickly in the group chat.

An embodiment of the present invention provides a method for displaying contents of a group chat. The method includes: receiving a query message entered by a user and carrying a specified user name; sending the query message to a server to request a list of historical chat records corresponding to the specified user name, wherein the list of historical chat records are interrupted by a plurality of current chat records in the group chat; receiving the list of historical chat records that is sent by the server and pulled according to the specified user name; and displaying the list of historical chat records sent by the server following the plurality of current chat records to continue a topic carried by the list of historical chat records and interrupted by the plurality of current chat records.

An embodiment of the present invention provides an apparatus for displaying contents of a group chat. The apparatus includes a memory storing instructions; and a processor coupled to the memory. When executing the instructions, the processor is configured for: receiving a query message entered by a user and carrying a specified user name; sending the query message to a server to request a list of historical chat records corresponding to the specified user name, wherein the list of historical chat records are interrupted by a plurality of current chat records in the group chat; receiving the list of historical chat records that is sent by the server and pulled according to the specified user name; and displaying the list of historical chat records sent by the server following the plurality of current chat records to continue a topic carried by the list of historical chat records and interrupted by the plurality of current chat records.

An embodiment of the present invention provides a non-transitory computer-readable storage medium containing computer-executable instructions for, when executed by one or more processors, performing a method for displaying contents of a group chat. The method includes: receiving a query message entered by a user and carrying a specified user name; sending the query message to a server to request a list of historical chat records corresponding to the specified user name, wherein the list of historical chat records are interrupted by a plurality of current chat records in the group chat; receiving the list of historical chat records that is sent by the server and pulled according to the specified user name; and displaying the list of historical chat records sent by the server following the plurality of current chat records to continue a topic carried by the list of historical chat records and interrupted by the plurality of current chat records.

To make the features and advantages of the present disclosure more comprehensible, various embodiments are described below with reference to the accompanying drawings.

DESCRIPTION OF EMBODIMENTS

To further explain the technical means and the effects of the present disclosure, specific implementation manners, structures, features, and effects of the present disclosure are described in detail below with reference to the accompanying drawings and embodiments.

Figure 1:
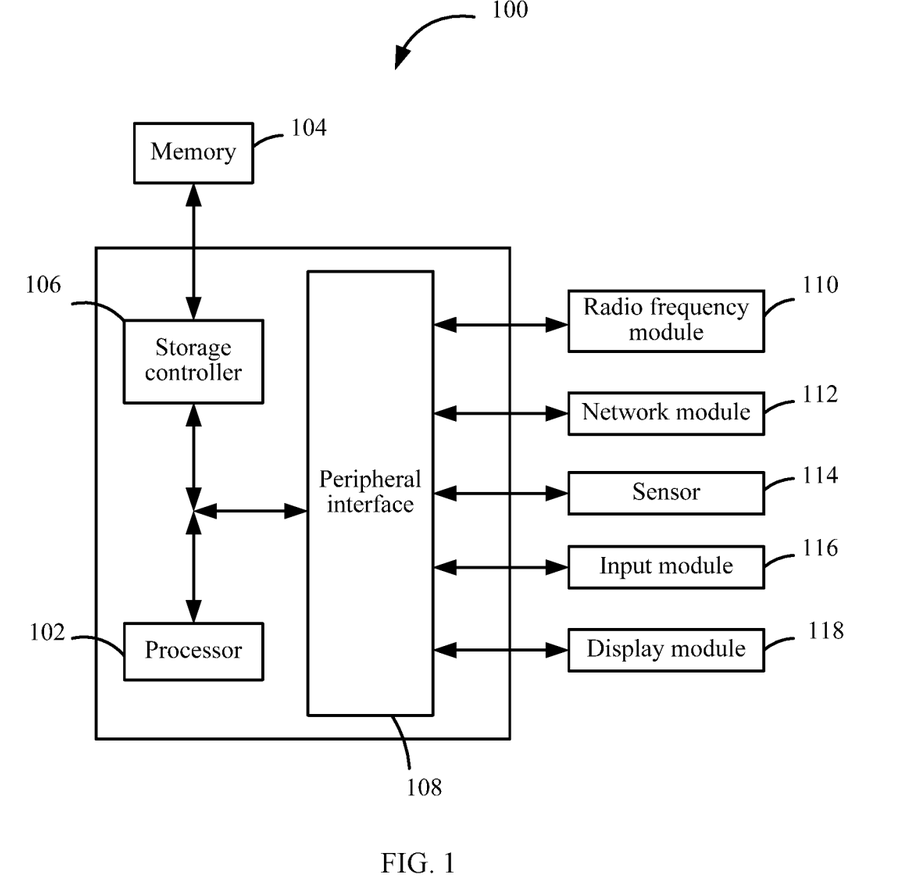
FIG. 1 illustrates a structural block diagram of an electronic terminal according to an embodiment of the present invention.

According to embodiments of the present invention, a method and an apparatus for displaying contents of a group chat are provided, and may be applicable to an electronic terminal. FIG. 1 is a structural block diagram of an electronic terminal according to an embodiment of the present invention.

As shown in FIG. 1, the electronic terminal 100 includes one or more (only one processor is shown in FIG. 1) processors 102, a memory 104, a storage controller 106, a peripheral interface 108, a radio frequency (RF) module 110, a network module 112, a sensor 114, an input module 116, and a display module 118. A person of ordinary skill in the art may understand that the structure shown in FIG. 1 is only for the purpose of illustration and does not constitute a limitation to the structure of the electronic terminal 100. For example, the electronic terminal 100 may also include more or fewer components than those shown in FIG. 1, or have a configuration different from that shown in FIG. 1. Specific examples of the foregoing electronic terminal 100 include, but are not limited to: a hand-held computer, a mobile phone, a media player, a vehicular device, a personal digital assistant, and various combinations of the foregoing devices.

A person of ordinary skill in the art may understand that, relative to the processor 102, all other components belong to peripherals, and the processor 102 is coupled to these peripherals via multiple peripheral interfaces 108. The peripheral interface 108 may be implemented on the basis of the following standards: a universal asynchronous receiver/transmitter (UART), general purpose input/output (GPIO), a serial peripheral interface (SPI), an inter-integrated circuit (I2C), but the standards are not limited to the foregoing standards. In some examples, the peripheral interface 108 may include only a bus. In other examples, the peripheral interface 108 may further include another component, such as one or more controllers, for example, a display controller configured to connect to a liquid crystal display panel or the storage controller 106 configured to connect to a memory. In addition, these controllers may be separated from the peripheral interface 108 and may be integrated into the processor 102 or a corresponding peripheral.

The memory 104 may be configured to store a software program and module, for example, a program instruction/module corresponding to the method/apparatus for displaying contents of a group chat in the embodiments of the present invention. The processor 102 runs the software program and module stored in the memory 104, to implement various function applications and data processing, that is, implement the method for displaying contents of a group chat. The memory 104 may include a high speed random access memory, and may further include a non-volatile memory, for example, one or more magnetic storage apparatuses, a flash memory, or another non-volatile solid-state memory. In some examples, the memory 104 may further include memories remotely disposed relative to the processor 102, and these remote memories may be connected to the electronic terminal 100 through a network. Examples of the network include but are not limited to, the Internet, an intranet, a local area network, a mobile communications network, and a combination thereof.

The RF module 110 is configured to receive and send an electromagnetic wave, and implement mutual conversion between the electromagnetic wave and an electrical signal, so as to communicate with a communications network or another device. The RF module 110 may include various existing circuit elements for performing these functions, such as an antenna, a radio frequency transceiver, a digital signal processor, a cipher/decipher chip, a subscriber identity module (SIM) card, and a memory. The RF module 110 may communicate with various networks such as the Internet, an intranet, and a wireless network, or communicate with other devices through a wireless network. The wireless network may include a cellular telephone network, a wireless local area network, or a metropolitan area network. The wireless network may use various communications standards, protocols, and technologies, which include, but are not limited to: a global system for mobile communications (GSM), an enhanced data GSM environment (EDGE) technology, a wideband code division multiple access (W-CDMA) technology, a code division multiple access (CDMA) technology, a time division multiple access (TDMA) technology, a wireless fidelity (WiFi) technology (for example, Institute of Electrical and Electronic Engineers IEEE 802.11 a, IEEE 802.11 b, IEEE802.11 g, and/or IEEE 802.11 n), Voice over internet protocol (VoIP), worldwide interoperability for microwave access (Wi-Max), other protocols for email, instant messaging, and short message service, and any other suitable communications protocols, and even may include some protocols that have not been developed.

The network module 112 is configured to receive and send a network signal. The network signal may be a wireless signal or a wired signal. In an example, the network signal is a WiFi signal. Because an operating frequency of the WiFi is in a frequency band of a radio frequency, in this case, the network module may have a hardware structure similar to that of the RF module 110. That is, the network module may include an antenna, a radio frequency transceiver, a digital signal processor, a cipher/decipher chip, or the like. In an example, the network signal is a wired network signal. In this case, the network module 112 may include a processor, a random access memory, a converter, a crystal oscillator, or the like.

Examples of the sensor 114 include but are not limited to: an optical sensor, an operating sensor, and another sensor. Specifically, an optical sensor may include an ambient light sensor and a proximity sensor. The ambient light sensor may sense brightness of ambient light, so that some modules executed by the processor 102 can automatically adjust display output by using an output of the ambient light sensor. The proximity sensor may switch off the display output when the electronic terminal 100 is moved to the ear. As one type of motion sensor, a gravity acceleration sensor may detect magnitude of accelerations in various directions (generally on three axes), may detect magnitude and a direction of gravity when static, and may be applied to an application that recognizes an attitude of a mobile phone (for example, switching between landscape orientation and portrait orientation, a related game, magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal device 100, are not described herein again.

The input module 116 may be configured to receive input character information, and generate a keyboard, mouse, joystick, optical, or track ball signal input related to the user setting and function control. Specifically, the input module 116 may include keys and a touch surface. For example, the keys may include a character key used to input characters and a control key used to trigger a controlling function. Examples of the control key include a "return to homepage"

key, a power-on/power-off key, a photograph key, and the like. The touch surface may collect a touch operation of a user on or near the touch panel (such as an operation of a user on or near the touch surface by using any suitable object or accessory such as a finger or a stylus), and drive a corresponding connection apparatus according to a preset program. Optionally, the touch surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 102. Moreover, the touch controller can receive and execute a command sent from the processor 102. In addition, the touch surface may be a resistive, capacitive, infrared, or surface sound wave type touch surface. In addition to the touch surface, the input module 116 may further include other input devices. The foregoing other devices include but are not limited to one or more of a physical keyboard, a track ball, a mouse, and a joystick.

The display module 118 may be configured to display information entered by the user, information provided for the user, and various graphical user interfaces of the electronic terminal 100. The graphical user interfaces may be formed by a graph, a text, an icon, a video, or any combination thereof. In an example, the display module 118 includes a display panel. For example, the display panel may be a liquid crystal display panel (LCD), an organic light-emitting diode display (OLED), or an electro-phoretic display (EPD). Further, the touch surface may be disposed on the display panel, to form a whole with the display panel. In other embodiments, the display module 118 may further include a display apparatus of another type, for example, a projection display device. Compared with a general display panel, the projection display device needs to include components used for projection, such as a lens set.

The foregoing software program and module include: an operating system and a display module of chat contents. In the embodiments of the present invention, the operating system such as LINUX, UNIX, or WINDOWS, or a mobile operating system such as Android or IOS may include various software components and/or drives configured to manage system tasks (for example, management of memory, control of a storage device, and management of a power supply), and can communicate with various hardware or software components, to provide a running environment for other software components. The display module of chat contents is configured to display specified chat contents in the group of the electronic terminal 100 on the basis of the operating system.

Figure 2:
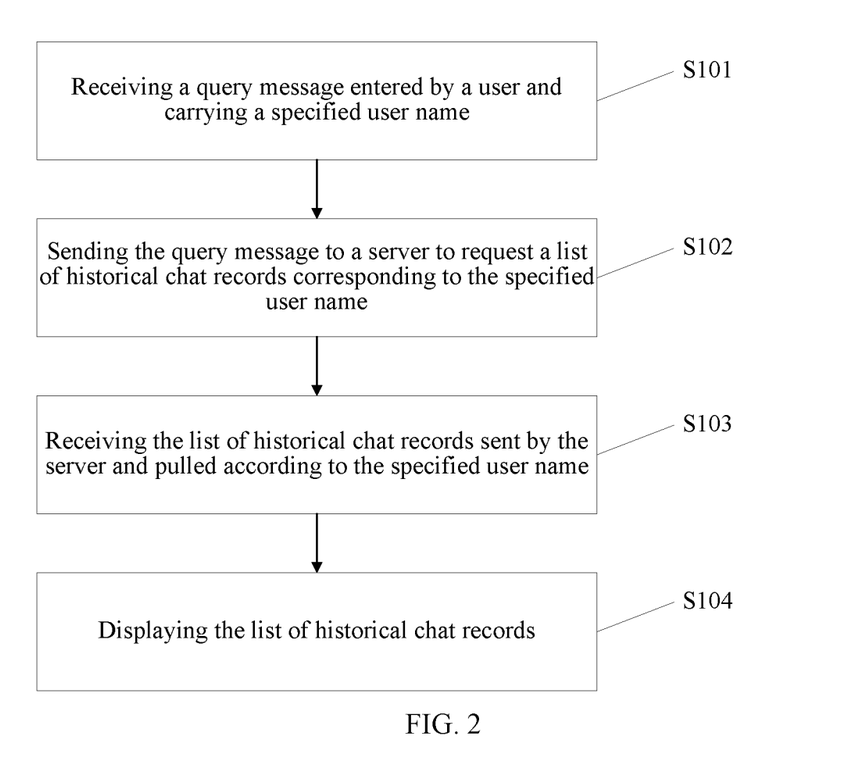
FIG. 2 illustrates a flowchart of a method for displaying contents of a group chat according to an embodiment of the present invention.

FIG. 2 is a flowchart of a method for displaying contents of a group chat according to an embodiment of the present invention. The content-display method in this embodiment may be applied to the electronic terminal 100 shown in FIG. 1. As shown in FIG. 2, the display method in this embodiment includes the followings.

Step S101: Receiving a query message entered by a user and carrying a specified user name.

In this embodiment, a group may be any instant messaging session group including more than two members. For example, a QQ group, or a discussion group. The method in this embodiment is applied to a group session. Different from one-to-one private chat, different topics may be discussed among different members. Therefore, a chat between two people or among multiple people in a group may possibly be interrupted by other topics.

In one example, the query message is received via an input box on a group chat window. Further, the query message is a string in a specified format. Specifically, the string in a specified format carries a specified user name corresponding to the historical chat records the user is to query. The string in the specified format may be received on an input window used for receiving characters entered by a user, such as an input box on a group chat window. The string in the specified format includes a first preset character, a specified user name, and a second preset character, etc. The first preset character and the second preset character may be the same or may be different. For example, the string in a specified format may be "@specified user name@" or "#specified user name#".

Step S102: Sending the query message to a server to request a list of historical chat records corresponding to the specified user name.

Specifically, after the query message is received from the input window used for receiving characters entered by the user, the query message is sent to the server to request the list of historical chat records corresponding to the specified user name. In one embodiment, after the query message is received on the window used for receiving characters entered by the user, a request for a list of historical chat records is automatically sent to the server. Specifically, the list of historical chat records may include recent chat records, such as a list of chat records within a specified period of time set in advance according to actual needs. For example, the specified period of time may be within one hour or half day from the current time. Further, the specified period of time may be a time range set by the system. Or only chat contents of the most recent chat in the group corresponding to the specified user name may be obtained.

Further, after the query message is sent to the server, the query message may not be displayed in a sent-message display window of a group chat window.

Step S103: Receiving the list of historical chat records sent by the server and pulled according to the specified user name.

Specifically, the server pulls the list of historical chat records within the specified period of time from a database according to the query message.

Step S104: Displaying the list of historical chat records.

Specifically, the list of historical chat records include the list of chat records corresponding to the specified user name within the specified period of time. For example, a list of chat records within the day may be requested, or a list of chat records within one hour may be requested, or only the chat contents of the most recent chat in the group recently corresponding to the specified user name may be obtained.

Further, the historical chat records are displayed on a window used for receiving chat contents entered by users, such as an input box of a group chat window only for users to check.

In the method in this embodiment, a query message carrying a specified user name is sent to a server to request a list of historical chat records corresponding to the specified user name, and the list of historical chat records is displayed, so that recent historical chat records of the specified user name can be viewed quickly and efficiently.

Figure 3:
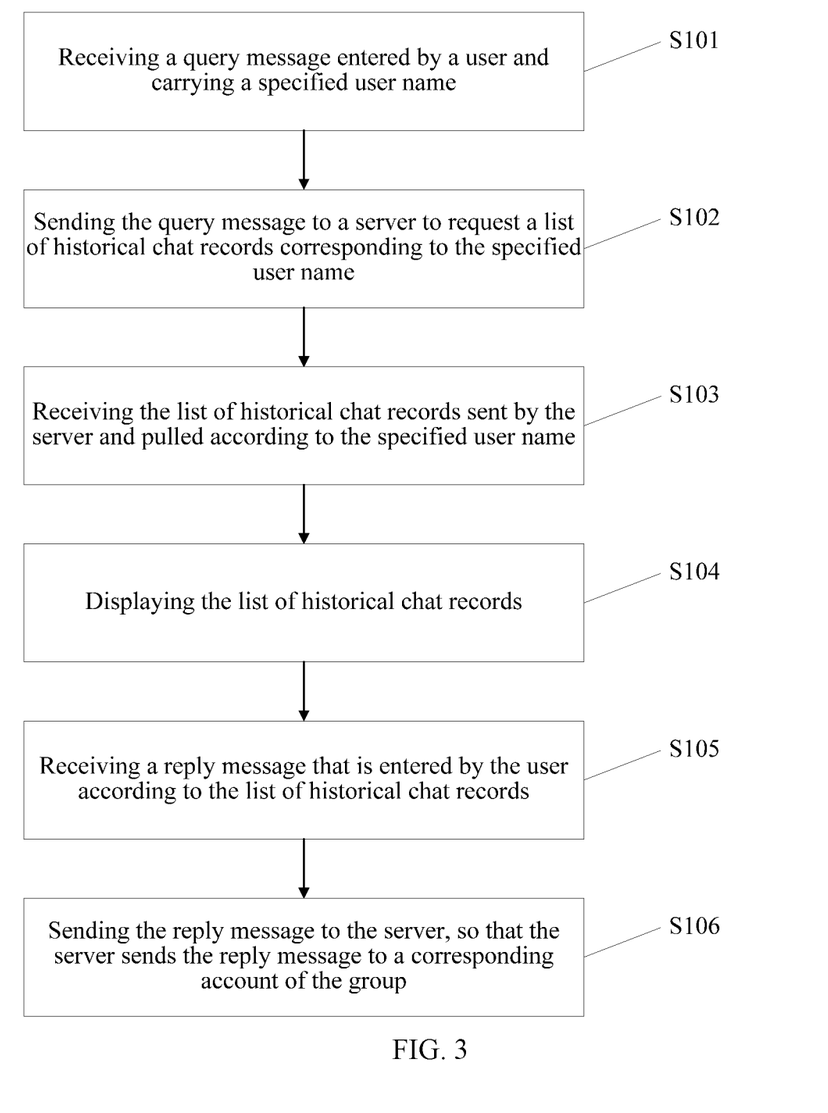
FIG. 3 illustrates a flowchart of another method for displaying contents of a group chat according to an embodiment of the present invention.

FIG. 3 is a flowchart of a method for displaying contents of a group chat according to an embodiment of the present invention. The technical solution of this embodiment is similar to that of the embodiment associated with FIG. 2. As shown in FIG. 3, the method in this embodiment includes the followings.

Step S101: Receiving a query message entered by a user and carrying a specified user name.

Figure 4:
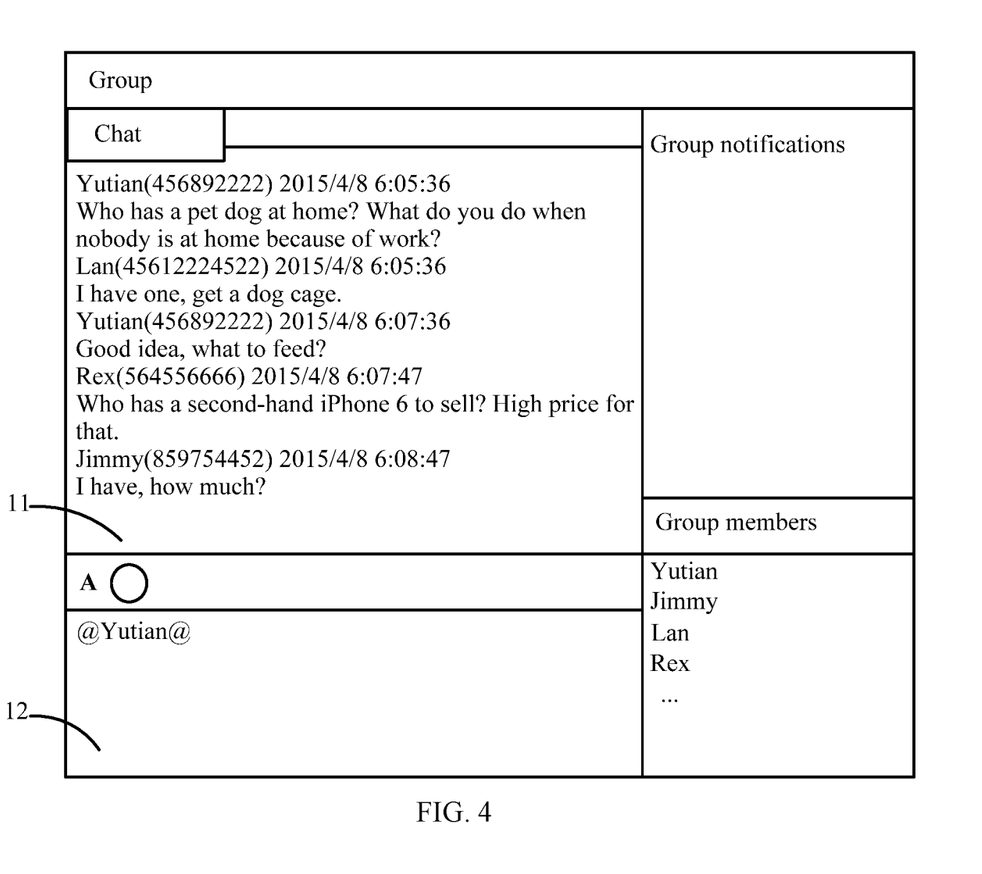
FIG. 4 illustrates a schematic diagram of displayed contents of a group chat according to an embodiment of the present invention.

FIG. 4 is a schematic diagram of displayed contents of a group chat in an example according to an embodiment of the present invention. As shown in FIG. 4, a sent-message display window 11 displays chat records that are already sent by members in the group. The chat records include a topic about raising a dog between a user named "Lan" and a user named "Yutian". Because the topic of raising a dog is interrupted by topics of other group members, if the user named "Lan" wants to continue the topic of raising a dog, contents replied with by the user named "Yutian" need to be obtained. As shown in FIG. 4, if the user Lan wants to view a list of historical chat records of Yutian, the user Lan enters the query message, for example, a string "@Yutian@" shown in FIG. 4, on a window 12 used for receiving characters entered by a user. Certainly, the query message may be another string carrying the user name "Yutian" and in a specified format, for example, "#Yutian#".

Step S102: Sending the query message to a server to request a list of historical chat records corresponding to the specified user name, where the query message is a string in a specified format.

Step S103: Receiving the list of historical chat records sent by the server and pulled according to the specified user name.

Step S104: Displaying the list of historical chat records.

Figure 5:
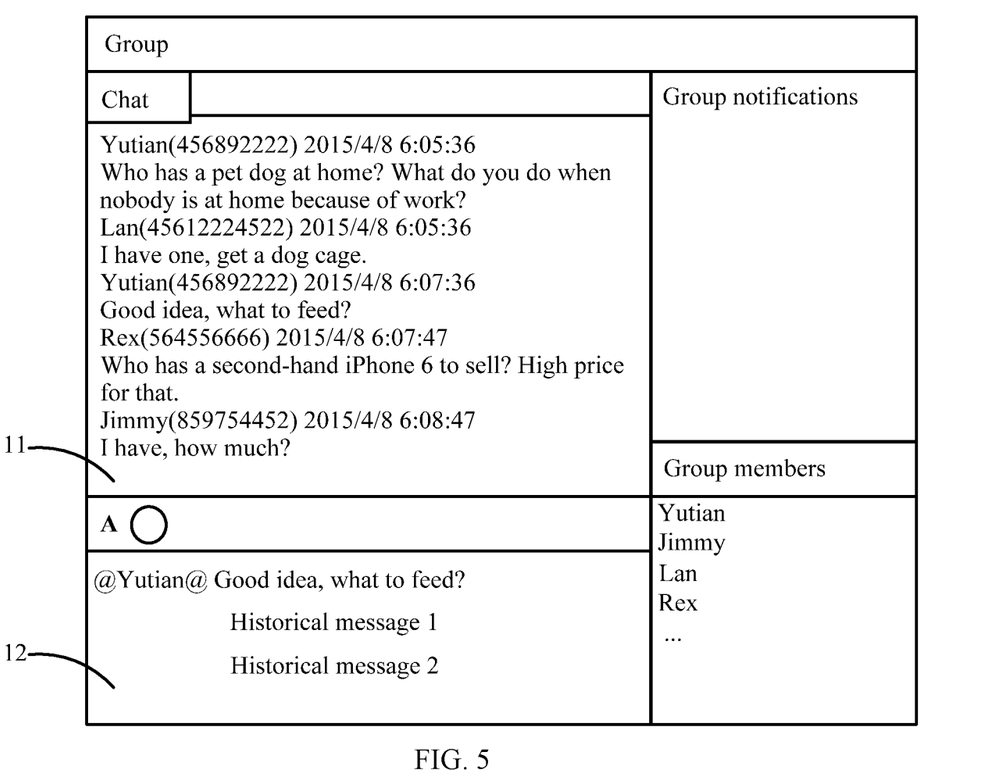
FIG. 5 illustrates a schematic diagram of displayed contents of a group chat according to another embodiment of the present invention.

FIG. 5 is a schematic diagram of displayed contents of a group chat in another example according to an embodiment of the present invention. After the list of historical chat records sent by the server is received, the list of historical chat records is displayed on the window 12 used for receiving characters entered by a user. Specifically, as shown in FIG. 5, the historical chat records are displayed on the window 12 used for receiving characters entered by a user, and the list of historical chat records sent by the user named "Yutian" in the group is displayed, and include "Good idea, what to feed?", "historical message 1", and "historical message 2", and the like.

Step S101 to step S104 are similar to those in the previous described embodiment, and details are not repeated herein.

Step S105: Receiving a reply message that is entered by the user according to the list of historical chat records.

In an example, the user may reply according to the historical message "Good idea, what to feed?" in the list of historical chat records displayed on the window 12 used for receiving characters entered by a user. For example, the user replies with a message "One bowl of rice is enough".

Further, the historical chat records displayed on the window 12 used for receiving characters entered by a user are sent to the server together with the reply message.

Step S106: Sending the reply message to the server, so that the server sends the reply message to a corresponding account of the group.

Figure 6:
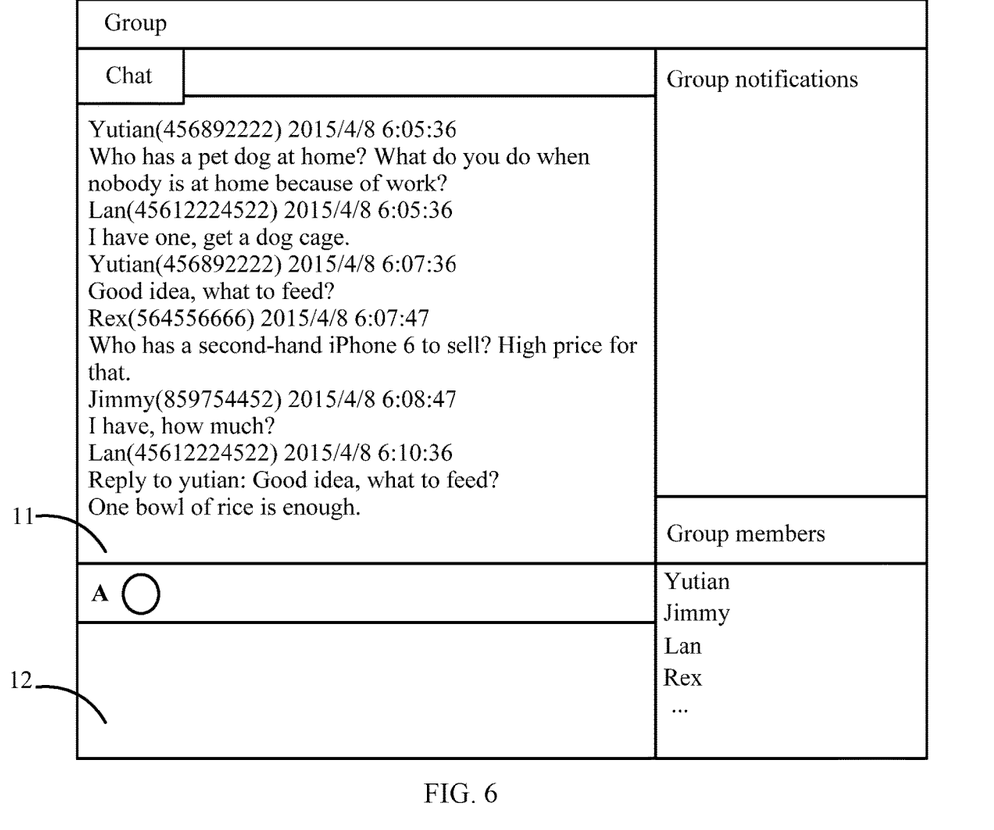
FIG. 6 illustrates a schematic diagram of displayed contents of a group chat according to another embodiment of the present invention.

FIG. 6 is a schematic diagram of displayed contents of a group chat in another example according to an embodiment of the present invention. As shown in FIG. 6, the contents of the reply message may be "Reply to Yutian. Good idea, what to feed?—One bowl of rice is enough.". Contents "Reply to Yutian. Good idea, what to feed?" are automatically added, so that the reply message is targeted, and it is convenient for group members to recognize which message of which group member is replied to with the reply message.

Further, the method further includes: sending the reply message to the server, so that the server sends the reply message to a corresponding account of the specified user name.

Specifically, in an example, the reply message "Reply to Yutian. Good idea, what to feed?—One bowl of rice is enough." may be directly sent to the corresponding account of the user "Yutian".

Further, after the message is sent, a private chat window corresponding to the account of the user "Yutian" may be automatically opened.

According to the method in this embodiment, a reply is made to historical chat records returned by a server and corresponding to a specified user name, so that chat contents between a user and a specified user that corresponds to the specified user name are more coherent, and the chat is not interrupted by a message sent by another member in a group.

Figure 7:
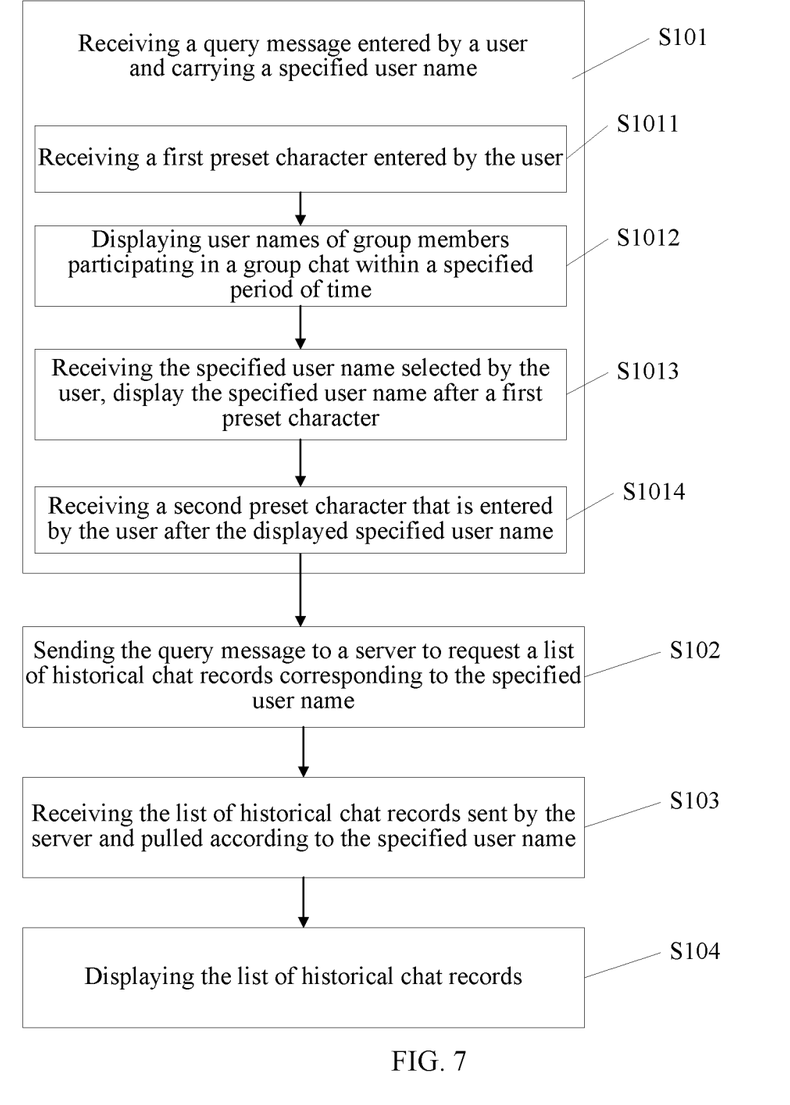
FIG. 7 illustrates a flowchart of another method for displaying contents of a group chat according to an embodiment of the present invention.

FIG. 7 is a flowchart of a method for displaying contents of a group chat according to an embodiment of the present invention. The technical solution of this embodiment is similar to that of previously-described embodiments. As shown in FIG. 7, the method in this embodiment includes the followings.

Step S101: Receiving a query message entered by a user and carrying a specified user name.

In an implementation, the query message carrying the specified user name is a string in a specified format. The string in a specified format includes a first preset character, a specified user name, and a second preset character. The first preset character and the second preset character may be the same or may be different. For example, the string in a specified format may be "@specified user name@" or "#specified user name#". The string in a specified format may be a string carrying the specified user name and in another format. The present disclosure does not limit the format of the string.

In this embodiment, step S101 may further include the followings.

Step S1011: Receiving the first preset character entered by the user. For example, the first preset character is "@".

Step S1012: Displaying user names of group members participating in a group chat within a preset period of time.

Specifically, after the first character "@" entered by the user is received, the user names of the members participating in the group chat recently or within a specified period of time are displayed on a window used for receiving characters entered by a user. For example, the specified period of time may be within one hour or half day from now, or the specified period of time may be a time range set by the system. In an example, as shown in FIG. 4, after the first character "@" entered by the user is received on the window 12 used for receiving the characters entered by the user, user names "Yutian", "Rex", "Jimmy", and the like are displayed on the window 12 used for receiving the characters entered by the user.

Step S1013: Receiving the specified user name selected by the user, and displaying the specified user name after the first preset character. For example, displaying specified user names after the "@".

The user may select the specified user name from the displayed user names. In an example, as shown in FIG. 4, the user selects the user name "Yutian", then a display result is "@Yutian".

Step S1014: Receiving the second preset character entered by the user after the displayed specified user name. For example, the second preset character is "@".

Specifically, when the second character "@" entered by the user is received, the query message is sent to a server to request a list of historical chat records corresponding to the specified user name.

Step S102: Sending the query message to the server to request the list of historical chat records corresponding to the specified user name, where the query message is a string in a specified format.

Step S103: Receiving the list of historical chat records sent by the server and pulled according to the specified user name.

Step S104: Displaying the list of historical chat records.

For other details about this embodiment, refer to the previously described embodiments, and details are not repeated herein.

According to the method in this embodiment, a first preset character of a string in a specified format is entered, and user names of group members recently participating in a group chat may be directly obtained, so that it is convenient for a user to directly select a specified user name. In addition, the string in a specified format is entered, so that historical chat records corresponding to the specified user name can be directly pulled. Further, the historical chat records are recent chat contents. When chat contents are updated very quickly, previous chat records that are overflown can be quickly viewed even in a relatively big group.

Figure 8:
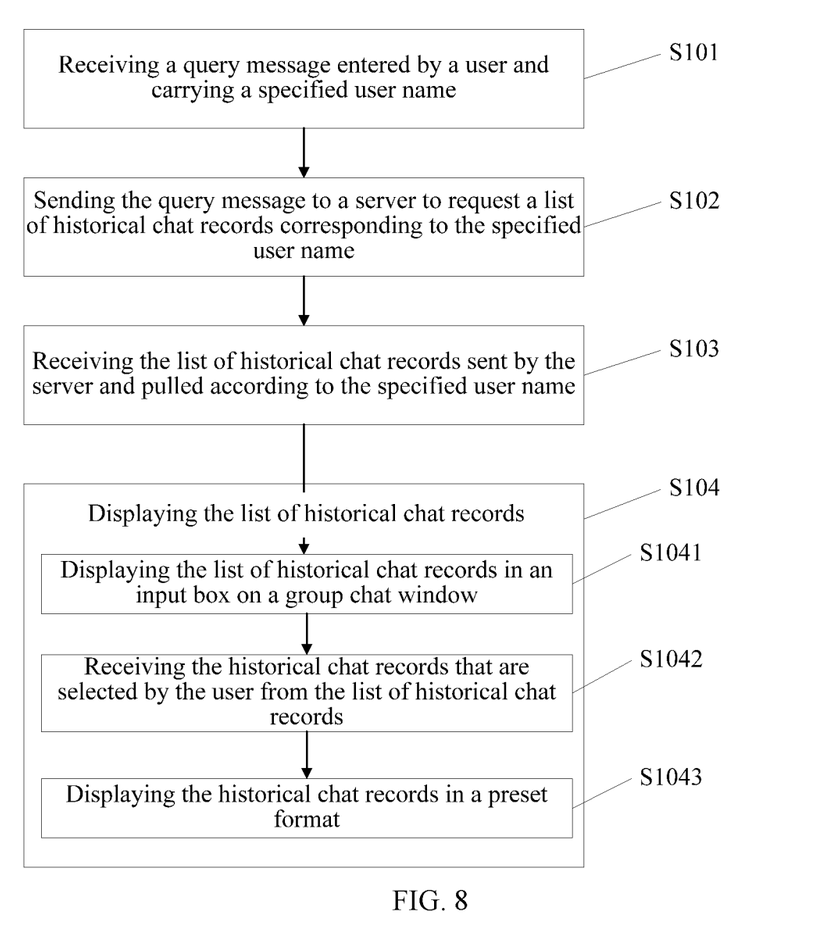
FIG. 8 illustrates a flowchart of another method for displaying contents of a group chat according to an embodiment of the present invention.

FIG. 8 is a flowchart of a method for displaying contents of a group chat according to an embodiment of the present invention. A technical solution of this embodiment is similar to that of an embodiment. As shown in FIG. 8, the method in this embodiment includes the following steps.

Step S101: Receiving a query message entered by a user and carrying a specified user name.

Step S102: Sending the query message to a server to request a list of historical chat records corresponding to the specified user name, where the query message is a string in a specified format.

Step S103: Receiving the list of historical chat records sent by the server and pulled according to the specified user name.

Step S104: Displaying the list of historical chat records.

In this embodiment, step S104 may include the followings.

Step S1041: Displaying the list of historical chat records in an input box on a group chat window.

Specifically, as shown in FIG. 5, the historical chat records are displayed on a window 12 used for receiving characters entered by a user, and historical chat records sent by a user named "Yutian" in a group are displayed, and include "Good idea, what to feed?", "historical message 1", and "historical message 2".

Step S1042: Receiving the historical chat records that are selected by the user from the list of historical chat records.

Further, as shown in FIG. 5, the messages "Good idea, what to feed?", "historical message 1", and "historical message 2" displayed on the window 12 used for receiving the characters entered by the user are characters that can trigger a specified operation, for example, a clickable blue character. The specified operation is receiving a selection operation of the user. If a clicking operation on the message "Good idea, what to feed?" by the user is received, the other two messages "historical message 1" and "historical message 1" are removed from being displayed on the window 12 used for receiving the characters entered by the user.

Step S1043: Displaying the historical chat records in a preset format.

Further, a format of a message selected by a user may be changed. For example, if the message "Good idea, what to feed?" is selected by the user, the display is updated to "Reply to Yutian. Good idea, what to feed?".

Further, the method further includes: receiving a reply message entered by the user for the historical chat records. The specified historical chat records displayed in the preset format may be sent to the server together with the reply message sent by the user, and the specified historical chat records are sent to a corresponding account of the group (as shown in FIG. 6) or a corresponding account of the specified user name by using the server. For other details about this embodiment, refer to the previously described embodiments, and details are not repeated herein.

According to the method in this embodiment, obtained chat contents are displayed in a specified manner, so that a user can reply to a group chat targetedly, thereby improving user experience.

Figure 9:
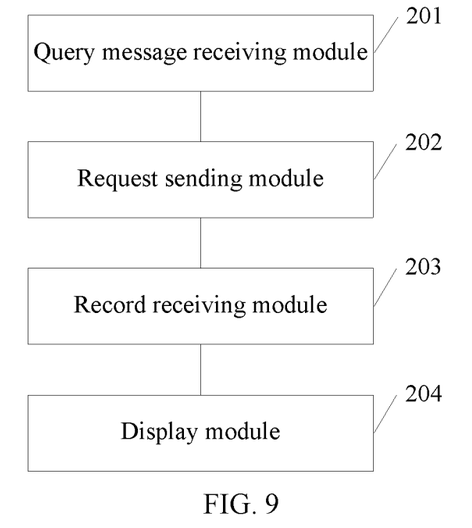
FIG. 9 illustrates a structural block diagram of an apparatus for displaying contents of a group chat according to an embodiment of the present invention.

FIG. 9 is a structural block diagram of an apparatus for displaying contents of a group chat according to an embodiment of the present invention. The technical solutions of the apparatus may be similar to that of the method, more details of which may refer to previously described embodiments. As shown in FIG. 9, the apparatus in this embodiment includes: a query message receiving module 201, a request sending module 202, a record receiving module 203, and a display module 204.

The query message receiving module 201 is configured to receive a query message entered by a user and carrying a specified user name.

The request sending module 202 is configured to send the query message to a server to request a list of historical chat records corresponding to the specified user name, where the query message is a string in a specified format.

The record receiving module 203 is configured to receive the list of historical chat records sent by the server and pulled according to the specified user name.

The display module 204 is configured to display the list of historical chat records.

By using the apparatus in this embodiment, an entered query message carrying a specified user name is sent to a server to request a list of historical chat records corresponding to the specified user name, and the list of historical chat records is displayed, so that recent historical chat records of the specified user name can be viewed efficiently and quickly.

Figure 10:
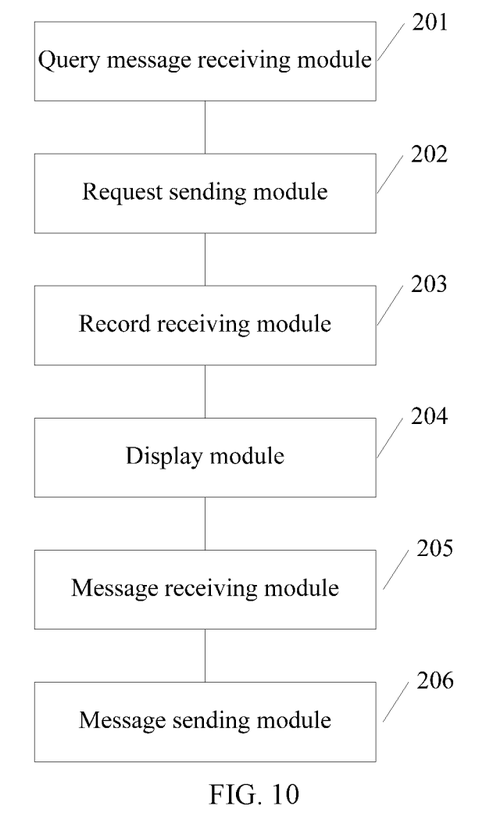
FIG. 10 illustrates a structural block diagram of another apparatus for displaying contents of a group chat according to an embodiment of the present invention.

FIG. 10 is a structural block diagram of an apparatus for displaying contents of a group chat according to an embodiment of the present invention. As shown in FIG. 10, the apparatus further includes: a message receiving module 205 and a message sending module 206.

The message receiving module 205 is configured to receive a reply message that is entered by the user according to the list of historical chat records.

The message sending module 206 is configured to send the reply message to the server, so that the server sends the reply message to a corresponding account of the group.

The message sending module 206 is further configured to send the reply message to the server, so that the server sends the reply message to a corresponding account of the specified user name.

By using the apparatus in this embodiment, a reply is made to a list of historical chat records that is returned by a server and that corresponds to a specified user name, so that chat contents between a user and a specified user that corresponds to the specified user name are more coherent, and the chat is not interrupted by a message sent by another member in a group.

Figure 11:
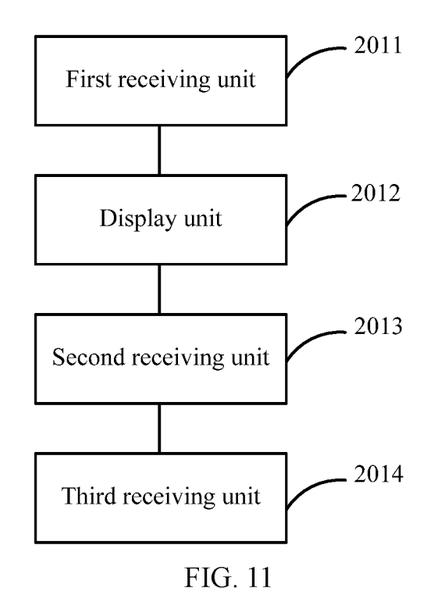
FIG. 11 illustrates a structural block diagram of another apparatus for displaying contents of a group chat according to an embodiment of the present invention.

FIG. 11 is a structural block diagram of an apparatus for displaying contents of a group chat according to an embodiment of the present invention. Based on the previous embodiment, the query message carrying the specified user name is a string in a specified format. The string in a specified format includes a first preset character, a specified user name, and a second preset character. The first preset character and the second preset character may be the same or may be different. For example, the string in a specified format may be "@specified user name@" or "#specified user name#". As shown in FIG. 11, the query message receiving module 201 includes: a receiving unit 2011, a display unit 2012, a second receiving unit 2013, and a third receiving unit 2014.

The receiving unit 2011 is configured to receive the first preset character entered by the user, for example, the first preset character is "@". The display unit 2012 is configured to: after the first receiving unit 2011 receives the first preset character entered by the user, display user names of group members participating in the group chat within a preset period of time. The second receiving unit 2013 is configured to receive the specified user name selected by the user, where the display unit 2012 is further configured to display the specified user name after the first preset character. The third receiving unit 2014 is configured to receive the second preset character that is entered by the user after the displayed specified user name, for example, the second preset character is "@".

By using the apparatus in this embodiment, a preset character of a string in a specified format is entered, and user names of group members recently participating in a group chat may be directly obtained, so that it is convenient for a user to directly select a specified user name. In addition, the string in a specified format is entered, so that historical chat records corresponding to the specified user name can be directly pulled. Further, the historical chat records are recent chat contents. When chat contents are updated very quickly, previous chat records that are overwhelmed can be quickly viewed even in a relatively big group.

Figure 12:
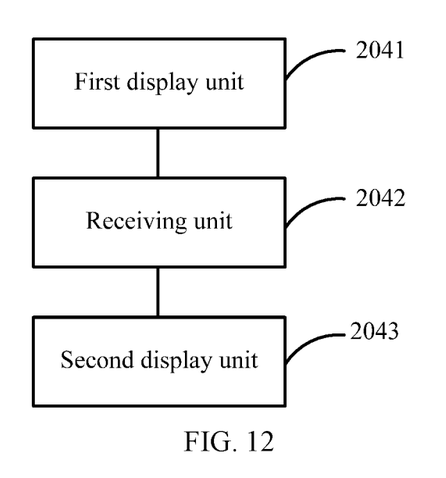
FIG. 12 illustrates a structural block diagram of another apparatus for displaying contents of a group chat according to an embodiment of the present invention.

FIG. 12 is a structural block diagram of an apparatus for displaying contents of a group chat according to the above embodiment of the present invention. As shown in FIG. 12, the display module 204 includes a display unit 2041, a receiving unit 2042, and a second display unit 2043.

The display unit 2041 is configured to display the list of historical chat records in an input box on a group chat window. The receiving unit 2042 is configured to receive the historical chat records that are selected by the user from the list of historical chat records. The second display unit 2043 is configured to display the historical chat records in a preset format.

Further, referring to FIG. 10, the message receiving module 205 is further configured to receive a reply message that is entered by the user for the historical chat records.

By using the apparatus in this embodiment, obtained chat contents are displayed in a specified manner, so that a user can reply to a group chat targetedly, thereby improving user experience.

According to the structure of the electronic terminal shown in FIG. 1, the electronic terminal includes a processor 102 and a memory 104. The memory 104 is configured to store a machine readable instruction, including a query message receiving instruction, a request sending instruction, a record receiving instruction, and a display instruction that can be executed by the processor 102.

Further, the machine readable instruction further includes a message receiving instruction and a message sending instruction that can be executed by the processor 102.

The processor 102 is configured to read and execute the query message receiving instruction, the request sending instruction, the record receiving instruction, and the display instruction that are stored in the memory 104, so as to implement functions of the modules in the apparatus for displaying contents of a group chat shown in FIG. 9.

The processor 102 is further configured to read and execute the message receiving instruction and the message sending instruction that are stored in the memory 104, so as to implement functions of the modules in the apparatus for displaying contents of a group chat shown in FIG. 10.

In addition, an embodiment of the present invention further provides a non-volatile computer readable storage medium, storing a computer executable instruction. The computer readable storage medium is, for example, a non-volatile memory such as an optical disk, a hard disk, or a flash memory. The computer executable instruction includes a query message receiving instruction, a request sending instruction, a record receiving instruction, and a display instruction, so that when the instruction is executed by a computer or a similar operation apparatus, operations in the method for displaying contents of a group chat are completed.

It should be noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

It should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the element.

The above descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations, or modifications to the above-disclosed technical content without departing from the scope of the technical solutions of the present disclosure to obtain equivalent embodiments. Any simple alteration, equivalent change or modification made to the above embodiments according to the technical essence of the present disclosure without departing from the content of the technical solutions of the present disclosure shall fall within the scope of the technical solutions of the present disclosure.

What is claimed is:

1. A method for displaying contents of a group chat, comprising:
   receiving a draft message entered by a user in an input box of a group chat window corresponding to a group, the input box being configured to receive a message to be sent to the group;
   determining a query message inside the draft message, the query message being a string carrying a specified username of a member of the group;
   before sending the draft message as a chat message for the group, sending the query message to a server to request a list of historical chat records of the group corresponding to the specified username;
   receiving the list of historical chat records sent by the server; and
   displaying the list of historical chat records concurrently with the draft message in the group chat window,
   wherein determining the query message inside the draft message comprises:
      in response to receiving a first preset character entered by the user in the input box, displaying candidate usernames of members of the group;
      in response to receiving the specified username selected by the user from the candidate usernames, displaying the specified username after the first preset character in the input box; and
      determining a string comprising the specified username as the query message.

2. The method for displaying contents of a group chat according to claim 1, further comprising:
   receiving a reply message entered by the user in the input box according to the list of historical chat records; and
   sending the reply message to the server as the chat message to be sent to the group.

3. The method for displaying contents of a group chat according to claim 2, wherein the sending the reply message to the server further comprises:
   sending the reply message to the server as the chat message to be sent to the member having the specified username in the group.

4. The method for displaying contents of a group chat according to claim 2, wherein: the list of historical chat records is displayed in the input box, and the method further comprises:
   receiving one or more historical chat records selected by the user from the list of historical chat records;
   displaying the one or more selected historical chat records in a preset format and removing one or more unselected chat records belonging to the list of historical chat records from being displayed in the input box; and
   receiving the reply message entered by the user corresponding to the selected one or more historical chat records.

5. The method according to claim 4, wherein displaying the one or more selected historical chat records in the preset format comprises:
   displaying the one or more selected historical chat records after the specified username in the input box, wherein the one or more selected historical chat records and the specified username are included in the reply message.

6. The method for displaying contents of a group chat according to claim 1, wherein the query message is a string in a specified format.

7. The method for displaying contents of a group chat according to claim 1, wherein determining the query message inside the draft message further comprises:
   receiving a second preset character entered by the user after the displayed specified username before determining the query message.

8. The method according to claim 7, wherein the first character is the same as the second character.

9. The method according to claim 1, wherein the list of historical chat records are displayed inside input box of the group chat window.

10. The method according to claim 1, further comprising:
    determining the candidate usernames according to members of the group that participates in a group chat within a period of time from a current time.

11. An apparatus for displaying contents of a group chat, comprising:
    a memory storing instructions; and
    a processor coupled to the memory and, when executing the instructions, configured for:
    receiving a draft message entered by a user in an input box of a group chat window corresponding to a group, the input box being configured to receive a message to be sent to the group;
    determining a query message inside the draft message, the query message being a string carrying a specified username of a member of the group;
    before sending the draft message as a chat message for the group, sending the query message to a server to request a list of historical chat records of the group corresponding to the specified username;
    receiving the list of historical chat records sent by the server; and
    displaying the list of historical chat records concurrently with the draft message in the group chat window,
    wherein determining the query message inside the draft message comprises:
       in response to receiving a first preset character entered by the user in the input box, displaying candidate usernames of members of the group;
       in response to receiving the specified username selected by the user from the candidate usernames, displaying the specified username after the first preset character in the input box; and
       determining a string comprising the specified username as the query message.

12. The apparatus for displaying contents of a group chat according to claim 11, the processor further configured for:
    receiving a reply message entered by the user in the input box according to the list of historical chat records; and
    sending the reply message to the server as the chat message to be sent to the group.

13. The apparatus for displaying contents of a group chat according to claim 12, wherein the sending the reply message to the server further comprises:
    sending the reply message to the server as the chat message to be sent to the member having the specified username in the group.

14. The apparatus for displaying contents of a group chat according to claim 11, wherein the query message is a string in a specified format.

15. The apparatus for displaying contents of a group chat according to claim 11, wherein determining the query message inside the draft message further comprises:
    receiving a second preset character entered by the user after the displayed specified username before determining the query message.

16. A non-transitory computer-readable storage medium containing computer-executable instructions for, when executed by one or more processors, performing a method for displaying contents of a group chat, the method comprising:
- receiving a draft message entered by a user in an input box of a group chat window corresponding to a group, the input box being configured to receive a message to be sent to the group;
- determining a query message inside the draft message, the query message being a string carrying a specified username of a member of the group;
- before sending the draft message as a chat message for the group, sending the query message to a server to request a list of historical chat records of the group corresponding to the specified username;
- receiving the list of historical chat records sent by the server; and
- displaying the list of historical chat records concurrently with the draft message in the group chat window,
- wherein determining the query message inside the draft message comprises:
  - in response to receiving a first preset character entered by the user in the input box, displaying candidate usernames of members of the group;
  - in response to receiving the specified username selected by the user from the candidate usernames, displaying the specified username after the first preset character in the input box; and
  - determining a string comprising the specified username as the query message.

17. The non-transitory computer-readable storage medium according to claim 16, the method further comprising:
- receiving a reply message entered by the user in the input box according to the list of historical chat records; and
- sending the reply message to the server as the chat message to be sent to the group.

18. The non-transitory computer-readable storage medium according to claim 17, wherein the sending the reply message to the server further comprises:
- sending the reply message to the server as the chat message to be sent to the member having the specified username in the group.

19. The non-transitory computer-readable storage medium according to claim 16, wherein the query message is a string in a specified format.

20. The non-transitory computer-readable storage medium according to claim 16, wherein determining the query message inside the draft message further comprises:
- receiving a second preset character entered by the user after the displayed specified username before determining the query message.

* * * * *